United States Patent [19]

Thomsen et al.

[11] Patent Number: 5,275,251
[45] Date of Patent: Jan. 4, 1994

[54] FULL HYDRAULIC STEERING SYSTEM COMPENSATING FOR STEERING ANGLE ERROR

[75] Inventors: Svend E. Thomsen; Vagn S. Bender, both of Nordborg; Aksel B. Jepsen, Augustenborg; Hans J. Cornett, Sydals, all of Denmark

[73] Assignee: Danfoss A/S, Nordborg, Denmark

[21] Appl. No.: 804,932

[22] Filed: Dec. 11, 1991

[30] Foreign Application Priority Data

Dec. 28, 1990 [DE] Fed. Rep. of Germany ....... 4042153

[51] Int. Cl.$^5$ .............................................. B62D 5/06
[52] U.S. Cl. .................... 180/142; 180/140
[58] Field of Search ............... 180/132, 140, 141, 142, 180/150, 154, 162; 280/91; 364/424.05

[56] References Cited

U.S. PATENT DOCUMENTS

| | | | |
|---|---|---|---|
| 4,690,431 | 9/1987 | Ito et al. | 180/140 X |
| 4,792,008 | 12/1988 | Hosotani | 180/142 |
| 4,836,319 | 6/1989 | Haseda et al. | 180/142 |
| 4,865,147 | 9/1989 | Uchida et al. | 180/142 X |
| 4,939,653 | 7/1990 | Tsurumiya et al. | 180/142 X |
| 5,038,878 | 8/1991 | Uchida et al. | 180/141 X |
| 5,203,420 | 4/1993 | Shiraishi | 180/142 X |
| 5,215,158 | 6/1993 | Pedersen | 180/132 |

Primary Examiner—David M. Mitchell
Assistant Examiner—Florian Zeender
Attorney, Agent, or Firm—Wayne B. Easton

[57] ABSTRACT

A hydraulic steering system having apparatus for compensating for steering angle error. On displacement of a steering handwheel, the steering handwheel angle, the steering motor angle and the steering handwheel speed are ascertained. The fluid flow between a steering control device and a steering motor is changed via auxiliary flow paths in dependence on the steering angle error. At every steering handwheel speed and every steering angle error, the change of the fluid flow is effected in dependence on the steering handwheel speed and the steering angle error. A multiplier multiplies the outputs of a difference-generating means and a differentiator together, the output of the multiplier being connected by way of a proportional element to a valve control device connected to pass signals to a valve arrangement which controls the auxiliary flow paths.

14 Claims, 1 Drawing Sheet

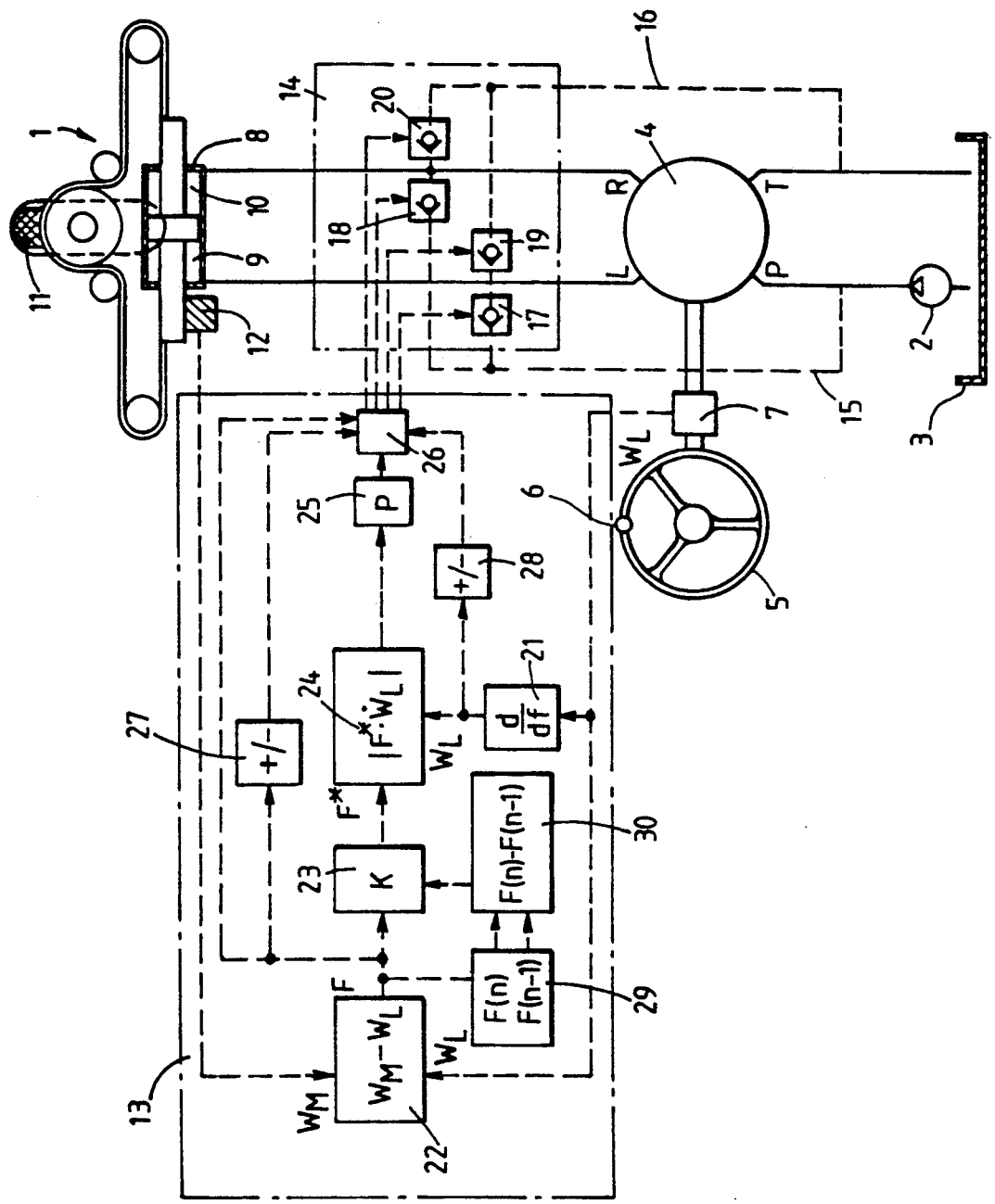

FULL HYDRAULIC STEERING SYSTEM COMPENSATING FOR STEERING ANGLE ERROR

BACKGROUND OF THE INVENTION

1. Field of the Invention

The invention relates to a fully hydraulic steering system compensating for steering angle error, in which, on displacement of a steering handwheel, a steering handwheel angle and a steering motor angle and also the steering handwheel speed are ascertained, and the fluid flow between a steering control unit and a steering motor is changed in dependence on the steering angle error; the invention also relates to a fully-hydraulic steering system, in particular for vehicles, having a steering motor, a steering control device connected thereto by way of a fluid path and operable with the assistance of a steering handwheel, a steering handwheel sensor, a steering motor sensor, a processing device, and an auxiliary fluid path that branches off from the fluid path and by-passes the steering control device and has a valve arrangement for controlling the flow of auxiliary fluid flowing through the auxiliary fluid path, which valve arrangement is operable by the processing device, the processing device comprising a difference-generating means for ascertaining the steering angle error and a differentiator for ascertaining the steering handwheel speed.

Steering systems are generally used in vehicles. Here, steered wheels or steering means are swung through an angle which corresponds to a specific angle of rotation of the steering handwheel. In the present application, however, the term "steering system" is intended to be understood in a wider sense. It also relates to the control of operating means in which a displacement of a work motor is effected proportionally with respect to the actuation of an operating lever. The operating lever is referred to hereinafter for the sake of simplicity as the "steering handwheel". The movement of the steering handwheel need not be restricted to rotary movements. When an operating lever is used as the steering handwheel, it is also possible to measure translational movements. The steering handwheel angle then corresponds to a linear distance. For example, a steering motor can bring an extension arm of a driven machine into a certain position which is dependent on the position of the steering handwheel. To facilitate understanding, however, the following description refers to a vehicle steering system.

2. Description of the Prior Art

In the case of a steering system known from U.S. Pat. No. 4,703,819, the rear wheel of a three-wheeled forklift truck is fully-hydraulically controlled. In that case, the position of the rear wheel is intended to correspond to the angular position of the steering handwheel. This state is identified by a button on the steering handwheel. Deviations of the two positions from one another may occur, for example, as a result of leakages. The deviation between the angular position of the steering handwheel and the angular position of the steered wheel is referred to hereinafter as the steering angle error. To compensate for the steering angle error, in the known steering system provision is made for a part of the fluid flow to the steering motor from the steering control unit to branch off directly to the tank, so that the steering handwheel can be turned without the steering motor being displaced further. It is thus possible to achieve correspondence between the steering handwheel position and the steering motor position. One construction of the known steering system contains a manually-operable valve, which can be operated in the neutral position of the steering motor. After operation of the valve, the steering handwheel can also be brought into the neutral position, without the rear wheel being steered with it. In another construction, the steering angle error compensation is effected under the control of a processing device. In that case, the steering handwheel position and the steering motor position are measured with the assistance of sensors. The measured values are processed by a microcomputer which operates an electromagnetic valve that connects to the tank a portion of the line from the steering control unit to the steering motor. Compensation of the steering angle error is effected, however, only if the speed of the steering handwheel exceeds a predetermined minimum speed or if the steering angle error has a specific minimum value. Below these values, there is a risk that, although an operator is able to turn the steering handwheel, this would not lead to a change in direction of the vehicle.

U.S. Pat. No. 4,792,008 describes a similar system in which additionally the directional dependency of the rotation of the steering handwheel is taken into account.

JP 60-261 778 A also describes a fully-hydraulic steering system with steering angle error compensation. In that case, to compensate for a steering angle error, additional hydraulic fluid is supplied to the steering motor with the aid of an additional pump, so that the positions of steering handwheel and steering motor can again be made to correspond.

SUMMARY OF THE INVENTION

The, invention is based on the problem of providing a fully hydraulic steering system compensating for steering angle error, with the aid of which the comfort of the operator when steering can be improved.

This problem is solved in the case of a system of the kind mentioned in the introduction in that the compensation is effected at every steering handwheel speed and every steering angle error, and the change in the fluid flow is effected in dependence on the steering handwheel speed and the steering angle error.

According to the invention, there are therefore no ranges in which no correction or compensation takes place. The necessary action on the fluid flow for the compensation, of which also the operator is aware, is dependent not only on the steering angle error, however, but also on the speed of the steering handwheel. When the operator turns the steering handwheel at a low speed, he is very sensitive to influences acting on the steering handwheel. If he turns the steering handwheel at a faster speed, however, relatively large compensation or correction influences are no longer felt so positively. At relatively high speeds of the steering handwheel, the operator may also no longer be so closely aware of whether the position of the steering motor corresponds to the position of the steering handwheel. Compensation of a steering angle error can be implemented relatively quickly in that case without the operator noticing any adverse influences. At relatively slow speeds of the handwheel on the other hand, compensation has to be performed with correspondingly greater care, in order that the comfort of the operator is not adversely affected.

In an advantageous form of the system, to change the fluid flow between the steering control unit and the steering motor, an auxiliary fluid flow is supplied or extracted, by-passing the steering control unit. When the auxiliary fluid flow is extracted, the steering motor does not follow completely the position of the steering handwheel. By this means, lagging of the steering handwheel behind the position of the steering motor can be compensated. If an auxiliary fluid flow is admitted, leading of the steering handwheel in advance of the steering motor can be compensated, that is to say, the steering motor is moved further by the additional auxiliary fluid than it would be by the control exerted by the steering handwheel alone.

Preferably, the auxiliary fluid flow is adjusted proportionally to the steering handwheel speed. There is essentially a linear relationship between the compensation and the steering handwheel speed.

It is also an advantage if the auxiliary fluid flow is adjusted proportionally to the steering angle error. With a relatively large steering angle error, a correspondingly larger compensation is required.

In an especially preferred construction, the steering angle error is ascertained only at an instant at which the steering motor passes through its neutral position, the auxiliary fluid flow being maintained only for a duration calculated in dependence on the steering angle error. With this system, relatively inexpensive sensors can be used. It is not necessary for the position of the steering motor to be ascertained across its entire range of operation. The steering angle error compensation is admittedly effected in that case substantially only when the steering motor has passed through the neutral position, but this is, however, also the main instance in which a steering angle error is disruptive. The operator would like to be able to rely on the steered vehicle travelling straight ahead when he has set the steering handwheel to a straight ahead position.

It is preferred herein for the duration T to be calculated according to the following equation:

$$T = D \times F/q$$

with D being the displacement of the metering motor, F the steering angle error and q the magnitude of the auxiliary fluid flow. The magnitude of the auxiliary fluid flow can in this case be made dependent on the steering handwheel speed. Since the displacement of the metering motor is known, from the above-mentioned equation it is possible to determine the length of time for which the auxiliary fluid flow must flow in order to compensate for a steering angle error. After this duration, it is assumed that the error has been compensated. The auxiliary fluid flow is turned off if no new steering angle error is determined in the intervening period, for example when the steering motor passes through the neutral position again.

In order also to include the possible situation of compensating for a new steering angle error arising during compensation, the steering angle error is preferably multiplied by an adaptive amplification factor, the magnitude of which is determined as a function of successively occurring steering angle errors. The compensation of the steering angle error is decisively improved as a result of that.

It is then preferable for the amplification factor to be increased when the magnitude of the steering angle error increases, for it to be kept constant when it decreases, and for it to be reduced when the steering angle error changes its sign. The result is that the amplification factor is adaptively adjusted so that as good a compensation as possible of the steering angle error can be achieved, even when new sources of error, for example leakages, appear in the meantime.

The problem is solved in a fully-hydraulic steering system of the kind mentioned in the introduction in that a multiplier is provided, which multiplies the outputs of the difference-generating means and the differentiator together, the output of the multiplier being connected by way of a proportional element to a valve control device connected to pass signals to the valve arrangement.

The multiplier determines the product from the steering angle error and steering handwheel speed. Preferably, it outputs the value of this product. The product is passed on to the valve control device, which operates the valve arrangement in dependence on this product. When the steering handwheel speed is high, or when there is a steering angle error, a large auxiliary fluid flow is fed into or extracted from the line between the steering control device and the steering motor. When the steering handwheel speed is low, or when the steering angle error is small, the auxiliary fluid flow is correspondingly smaller. The multiplier and the difference-generating means can be either of analog or digital construction, as can the differentiator. The fluid path contains the two lines from the steering control unit to the steering motor. Depending on the direction in which the steering motor is to be displaced, one of the two lines is pressurized with pump pressure and the other with tank pressure.

It is then preferable for the auxiliary fluid path to produce a connection between the fluid path and pump and/or fluid path and tank. Depending on which side of the steering motor an error has appeared, that is to say, whether the steering handwheel is lagging behind or is running ahead of the steering motor, compensation by bleeding the flow of auxiliary fluid from, or adding the flow of auxiliary fluid to, the main fluid flow path may be useful.

Preferably, the valve arrangement comprises pulse width modulation-controlled electromagnetic valves. In that case, no through-passage need be adjusted. On the contrary, the electromagnetic valves open fully when a corresponding pulse appears. At the end of the pulse, they close again completely. On average, the electromagnetic valve will then allow through an amount of fluid that would be allowed through by a valve, the partial opening width of which in relation to the full opening width corresponds to the pulse duty factor, that is to the ratio of pulses to cycles. Pulse width modulation-controlled electromagnetic valves are easily triggerable and require relatively little maintenance.

Preferably, sign discriminators which ascertain the sign of the steering angle error and of the steering handwheel speed, and pass them on to the valve control device are provided. The valve control device is able to operate the necessary valves taking into account the steering angle error and the steering handwheel speed. It is also an advantage for a comparator to be provided; this compares at least two steering angle errors ascertained at different times and has its output connected to an amplifier with variable amplification which is arranged between the difference-generating means and the multiplier. The comparator changes the amplification factor. Using the comparator, it is possible to the amplification factor adaptively to the needs of the system in order to improve the control accuracy and to compensate for the steering angle error always with the necessary auxiliary fluid flow. If the steering angle error appears to be increasing, then the auxiliary fluid flow used for the error compensation must be increased. In that case, the amplification factor increases. If, on the other hand, the steering angle error becomes less, then that is an indication that compensation is proceeding correctly. In that case, the amplification factor can be kept constant. If the sign of the steering angle error changes over, that is an indication that the amplification factor was too great. In that case the amplification factor is reduced.

In a preferred construction, the steering motor sensor is constructed as a switch which, on passing through a predetermined position of the steering motor, in particular the neutral position, generates a sampled signal on the basis of which the difference-generating means ascertains and holds the steering angle error. In that case it is not necessary to scan the entire working range of the steering motor with a sensor, and to establish the position of the steering motor accurately. A relatively expensive and complicated steering motor sensor would be required for that purpose. If the error compensation is restricted to the position in which the steering motor is located in its neutral position, the entire steering system can be of substantially simpler and less expensive construction. There need be no sacrifice in comfort of use associated with this, since a correction in the vicinity of the neutral position is adequate.

If more accurate resolution is required, provision can be made for the steering motor sensor to comprise a plurality of switches that are arranged across the working range of the steering motor. In that case, the position of the steering motor is recorded in discrete steps. The number of steps corresponds to the number of regions into which the position of the steering motor can be resolved.

BRIEF DESCRIPTION OF THE DRAWINGS

The single Figure shows a fully-hydraulic steering system.

DESCRIPTION OF THE PREFERRED EMBODIMENT

A fully-hydraulic steering system 1 has a pump 2, which conveys hydraulic fluid from a tank 3 through a pump connection P to a steering control device 4. The steering control device has a tank connection T, through which the hydraulic fluid flows back into the tank 3. The steering control device 4 is connected to a steering handwheel 5. On the steering handwheel 5 there is a button 6, with the aid of which an operator is able to determine the angular position in which the steering handwheel is set. The position of the steering handwheel 5 is sampled by way of a steering handwheel sensor 7.

The steering control device 4 is connected by way of two work connections R, L to the two work chambers 9, 10 of a steering motor 8. The steering motor 8 controls a steered wheel 11 which is rotatably fastened to a chassis (not illustrated) of a vehicle. The position of the steering motor 8 is ascertained by way of a steering motor sensor 12.

The two lines R, L between the steering control device 4 and the steering motor 8 form a main fluid path, through which the pump 2 conveys a main fluid flow controlled by the steering control device 4. If, for example, the wheel 11 is to be steered to the right, the steering control device 4 produces a path from the pump connection P to the line R. The right-hand work chamber 10 of the steering motor 8 is then supplied with pressure. The wheel 11 turns in a clockwise direction and the vehicle turns to the right. The fluid displaced from the left-hand work chamber 9 of the steering motor 8 flows through the line L and the steering control device 4 and through the connection T back into the tank 3. With the assistance of a metering motor, not shown, the steering control device meters in known manner the amount of fluid flowing through it, and interrupts the connection between the pump line P and the work line R when an amount of fluid which has brought the steering motor 8 into a position which corresponds to the angular position of the steering handwheel 5 has flowed through it. On account of inevitable leakages, for example as a result of imperfectly sealing valves in the steering control device 4, it may happen that in the course of time there is a disparity between the position of the steering motor 8 and the position of the steering handwheel 5. For example, the button 6 on the steering handwheel is already in the neutral position even though the steering motor 8 has not yet reached the neutral position. The operator, who relies on the indication provided by the button 6 on the handwheel 5 and wants to drive straight on, in reality drives in a slight curve. That makes itself felt in a disagreeable manner.

To compensate for this phenomenon, a processing device 13 is provided which, with the assistance of a valve arrangement 14, compensates for such a steering angle error, that is to say, a disparity between the position of the steering motor 8 and the position of the steering handwheel 5.

The valve arrangement 14 connects the main fluid path L, R with an auxiliary fluid path formed by an auxiliary pump line 15 and an auxiliary tank line 16. The valve arrangement 14 is arranged between the steering control device 4 and the steering motor 8. The auxiliary fluid path by-passes the steering control device 4, that is to say, the auxiliary pump line 15 is connected to the pump connection P. The auxiliary tank line 16 is connected to the tank connection T of the steering control device 4. The valve arrangement 14 comprises a first plus valve 17, which connects the auxiliary pump line 15 to the work line L, a second plus valve 18, which connects the auxiliary pump line 15 to the other work line R, a first minus valve 19, which connects the work line L to the auxiliary tank line 16, and a second minus valve 20, which connects the other work line R to the auxiliary tank line 16. Through the two plus valves 17, 18, an auxiliary fluid flow can be added to the main fluid flow in the main fluid path L, R. With the assistance of the minus valves 19, 20, an auxiliary fluid flow can be branched off from the main fluid flow. The plus valves 17, 18 and the minus valves 19, 20 are pulse-width modulation-controlled electromagnetic valves, that is to say, in a predetermined cycle, the valves are opened for a predetermined portion of the cycle and kept closed for the remaining part of the cycle. The mean opening degree is formed from the pulse duty factor, that is to say, from the ratio of opening time to cycle length of the valves.

The controlling of the valve arrangement 14 is effected with the assistance of the processing device 13.

The processing device 13 is connected on one side to the steering handwheel sensor 7 and on the other side to the steering motor sensor 12. The output signal $W_L$ of the steering handwheel sensor 7 is supplied firstly to a differentiator 21 and secondly to a difference-generating means 22. The output signal $W_M$ of the steering motor sensor 12 is also supplied to the difference-generating means 22. The differentiator 21 forms the time derivative of the signal $W_L$ with respect to time, that is, the steering handwheel speed. This time derivative is denoted in the drawing by a dot above the W. The difference-generating means 22 forms the difference $F = W_M - W_L$ and passes it to an amplifier 23, which has a variable amplifying factor K. The signal F* appears at the output of the amplifier 23. This signal is supplied to a multiplier 24 which forms the value of the product of $F^* \times W_L$. The output of the multiplier 24 is connected to a proportional element 25. The output of the proportional element 25 is connected to a valve control device 26. The valve control device 26 has an output for each plus valve 17, 18 and for each minus valve 19, 20.

The processing device 13 further comprises on the one hand a sign discriminator 27 for the sign of the steering angle error F, that is, the difference $W_M - W_L$ and on the other hand a sign discriminator 28 for the sign of the steering handwheel speed $W_L$. The outputs of the sign discriminators 27, 28 are supplied to the valve control device 26. On the basis of the information made available by the sign discriminators 27, 28, the valve control device is able to control the plus valves 17, 18 and the minus valves 19, 20 so that the steering angle error F is compensated.

The processing device further comprises a shift register 29, in which two consecutive values $F(n)$, $F(n-1)$ of the steering angle error F are stored. A matching element 30 forms the difference of the two consecutive steering angle errors $F(n)$, $F(n-1)$. The matching element 30 influences the amplification factor K of the amplifier 23. When the steering angle error F increases, that is to say, when the difference $F(n)$, $F(n-1)$ is greater than zero, the amplification factor is increased. When the steering angle error F decreases, that is to say, when the difference is less than zero, the amplification factor K is kept constant. When the steering angle error F changes its sign, the factor K is reduced.

As long as the steering handwheel 5 is not turned, its speed is zero. No compensation is carried out, that is to say, the steering motor 8 is supplied with hydraulic fluid neither through the main fluid path L,R, nor through the auxiliary fluid path 15, 16. When the steering handwheel is turned, however, compensation of any steering angle error F present can be carried out. The product of the steering handwheel speed and the steering angle error is then formed, which may also have been modified with the aid of proportional factors. From this, it follows that at a low steering handwheel speed compensation is effected gently, that is to say, only a small auxiliary fluid flow is used by the valve arrangement 14 for the compensation. If, on the other hand, the steering handwheel 5 is moved at greater speed, compensation of any steering angle error F present can be effected with a relatively large auxiliary fluid flow.

The steering motor sensor 12 has up to this point been regarded as a sensor which is capable of continuously determining the position of the steering motor 8 across the entire working range of the steering motor 8. In a simplified construction, the steering motor sensor 12 is constructed only as a switch, which delivers a signal exactly at the instant at which the steering motor 8 passes through its neutral position. Since the steering motor angle $W_M$ in that case is zero, the line between the steering motor sensor 12 and the difference-generating means 22 can also be used for the transfer of a sample-and-hold signal. At this instant the difference-forming means 22 ascertains the output $W_L$ of the steering handwheel sensor 7 and maintains this value. This value then corresponds to the steering angle error F. It can be processed in the customary manner. Because the displacement of the metering motor of the steering control device 4 and the magnitude of the auxiliary fluid flow adjusted by the plus valves 17, 18 or minus valves 19, 20 is known, it is possible to calculate the instant at which, or the length of time after which, sufficient auxiliary fluid has flowed in order to be able to conclude a steering angle error compensation. This duration T is determined according to the following equation:

$$T = D \times F/q$$

with D being the displacement of the metering motor, F the steering angle error and q the magnitude of the auxiliary fluid flow. In some cases, instead of the steering angle error F, the corrected steering angle error F must be used. The magnitude of the auxiliary fluid flow can be calculated from the pressure of the pump 2 and the opening degree of the valves 17 to 20. On the appearance of a steering angle error F when the steering motor 8 has passed through the neutral position, the plus valves 17, 18 and the minus valves 19, 20 are therefore held open only for the duration T. After that, one can assume that the error has been compensated. So that the valve control device 26 is able to calculated this duration T, the magnitude of the steering angle error F can additionally be supplied to it. Through the adaptive matching of the amplification factor K of the amplifier 23, it is possible to compensate for the disadvantage that further sources of error, for example additional leakage, may possibly occur during compensation of the steering angle error F. The next steering angle compensation is then effected also with a correspondingly larger auxiliary fluid flow. Should the steering motor 8 pass thorough the neutral position again during the compensation, a new compensation cycle is started, that is to say, a new compensation time T is determined. Alternatively, during the correction time T the rhythmic control of the particular electromagnetic valve can be abandoned. In that case, that electromagnetic valve is kept fully open. The variable q then corresponds to the auxiliary fluid flow with the electromagnetic valve fully open. As a second alternative, the variable T may also be the sum of the individual opening times of the electromagnetic valve when the electromagnetic valve is rhythmically controlled. In that case also, the variable q corresponds to the auxiliary fluid flow with the electromagnetic valve fully open.

The steering motor sensor 12 may also comprise a plurality of individual switches, which are operated by the steering motor in dependence on the position thereof. In that case, there is a comprise between a continuous position determination and the position determination only at zero crossing. The resolution in the working range of the steering motor 8 is then achieved in as many steps as there are switches present.

The steering system 1 illustrated can be constructed using ordinary means. It is merely necessary to arrange the valve arrangement 14 at the output of a known steering control device 4, and to provide for a suitable operation by means of the processing device 13.

We claim:

1. A hydraulic steering system comprising,
   a pump and a tank,
   steerable wheel means,
   a steering motor having a moveable part operably connected to said steering wheel means,
   a steering motor sensor for indicating a position of said steering motor,
   said steering motor having left and right chambers to which pressurized fluid may be selectively admitted to move said moveable part and said wheel means in a desired direction,
   a steering control device having pump and tank ports connected respectively to said pump and tank,
   said steering control device having left and right working ports,
   left and right lines connecting said left and right working ports respectively to said left and right chambers of said steering motor,
   a steering wheel and a steering wheel sensor for indicating a position of said steering wheel,
   left side inlet and outlet valve means connecting said left line to said pump,
   right side inlet and outlet valve means connecting said right line to said tank,
   processing device means responsive to said steering motor sensor and said steering wheel sensor to make a determination of a steering angle error based on the current positions of said steering wheel and said steering motor and a determination of a speed of said steering wheel, said processing device being operably responsive to said determinations to compensate for said steering error by controlling said left and right side inlet and outlet valve means to effect bypassing said steering control device via an auxiliary flow effected selectively between said steering motor and said pump or between said steering motor and said tank.

2. A hydraulic steering system according to claim 1 including means for adjusting said auxiliary flow proportionally to said speed of said steering wheel.

3. A hydraulic steering system according to claim 1 including means for adjusting said auxiliary flow proportionally to said steering angle error.

4. A hydraulic steering system according to claim 1 including means for making said determination of said steering angle error only at a time said steering motor passes through a neutral position for a duration T based on a magnitude of said steering angle error.

5. A hydraulic steering system according to claim 4 wherein said duration T is calculated via $T = D \times F/q$ where D is a displacement of said steering control device, F is said steering angle error and q is a magnitude of said auxiliary flow.

6. A hydraulic steering system according to claim 4 including means for multiplying said steering angle error by an adaptive amplification factor having a magnitude determined in dependence on successively occurring steering angle errors.

7. A hydraulic steering system according to claim 6 wherein said amplification factor is increased when said magnitude of the steering angle error increases, is kept constant when said magnitude of the steering angle error decreases, and reduced when said steering angle error changes its sign.

8. A hydraulic steering system having pump and tank means, a steering motor, a steering control device connected thereto by way of a fluid path and operable with the assistance of a steering handwheel, a steering handwheel sensor, a steering motor sensor, and an auxiliary fluid path that branches off from said fluid path and by-passes said steering control device and has a valve arrangement for controlling the auxiliary fluid flow flowing through said auxiliary fluid path, said hydraulic steering system having a unit comprising a difference-generating means for ascertaining steering, angle error and a differentiator for ascertaining steering handwheel speed, a multiplier which multiplies an output of said difference-generating means and an output of said differentiator together, a proportional element connected to an output of said multiplier, and a valve control device connected to said proportional element for passing signals to said valve arrangement.

9. A hydraulic steering system according to claim 8 wherein said auxiliary fluid path has connections between said fluid path and said pump and tank means.

10. A hydraulic steering system according to claim 8 wherein said valve arrangement includes pulse width modulation controlled electromagnetic valves.

11. A hydraulic steering system according to claim 8 including sign discriminators for respectively ascertaining a positive or negative sign of said steering angle error and a positive or negative sign of said steering handwheel speed and transmitting the ascertained signs to said valve control device.

12. A hydraulic steering system according to claim 8 including a comparator which compares at least two steering angle errors $F(n)$, $F(n-1)$ ascertained at different times with one another and an output of which is connected to an amplifier with variable amplification which is arranged between said difference-generating means and said multiplier.

13. A hydraulic steering system according to claim 8 wherein said steering motor sensor is constructed as a switch which when said steering motor passes through a predetermined position generates a sampled signal on a basis of which said difference-generating means ascertains and holds said steering angle error.

14. A hydraulic steering system according to claim 8 wherein said steering motor sensor has a plurality of switches which are arranged across a working range of said steering motor.

* * * * *